United States Patent [19]

Kolaitis et al.

[11] Patent Number: 5,589,449
[45] Date of Patent: Dec. 31, 1996

[54] PARTICULATE FOAM CONTROL AGENTS

[75] Inventors: Leonidas Kolaitis, Meise; Bertrand L. J. Lenoble, Bois-de-Lessines; Mark A. Prince, Overijse, all of Belgium

[73] Assignee: Dow Corning S.A., Seneffe, Belgium

[21] Appl. No.: 279,755

[22] Filed: Jul. 22, 1994

[30] Foreign Application Priority Data

Jul. 29, 1993 [GB] United Kingdom ............... 9315675
Jan. 14, 1994 [GB] United Kingdom ............... 9400599

[51] Int. Cl.⁶ .......................... B01D 19/04; C11D 3/20
[52] U.S. Cl. .................. 510/466; 252/321; 252/358; 510/358; 510/361; 510/377; 510/507
[58] Field of Search ............................ 252/321, 358, 252/174.15; 510/466

[56] References Cited

U.S. PATENT DOCUMENTS

| | | | |
|---|---|---|---|
| 3,843,558 | 10/1974 | Farminer et al. | 252/358 |
| 3,933,672 | 1/1976 | Bartolotta et al. | 252/321 X |
| 4,104,186 | 8/1978 | Caffarel et al. | 252/321 X |
| 4,400,288 | 8/1983 | Dhanani et al. | 252/174.15 X |
| 4,460,493 | 7/1984 | Lomas | 252/321 |
| 4,631,208 | 12/1986 | Westall | 427/387 |
| 4,690,688 | 9/1987 | Adams et al. | 44/76 |
| 4,713,193 | 12/1987 | Tai | 252/174.15 X |
| 4,732,694 | 3/1988 | Gowland et al. | 252/174.21 |
| 4,853,474 | 8/1989 | Bahr et al. | 556/445 |
| 5,055,229 | 10/1991 | Pelton et al. | 252/321 |
| 5,271,868 | 12/1993 | Azechi et al. | 252/358 |
| 5,376,301 | 12/1994 | Fleuren et al. | 252/174.15 |

FOREIGN PATENT DOCUMENTS

| | | | |
|---|---|---|---|
| 1188955 | 6/1985 | Canada . | |
| 0013028 | 12/1979 | European Pat. Off. | C11D 3/08 |
| 0031532 | 12/1980 | European Pat. Off. . | |
| 0125779 | 4/1984 | European Pat. Off. . | |
| 0192442 | 2/1986 | European Pat. Off. . | |
| 0212787 | 5/1986 | European Pat. Off. . | |
| 0206522 | 5/1986 | European Pat. Off. | C11D 3/00 |
| 0217501 | 7/1986 | European Pat. Off. . | |
| 0329842 | 12/1988 | European Pat. Off. | C11D 3/12 |
| 0381318 | 1/1990 | European Pat. Off. . | |
| 0484081 | 10/1991 | European Pat. Off. | C11D 3/37 |
| 0578424 | 6/1993 | European Pat. Off. | C11D 3/37 |
| 3805661 | 9/1989 | Germany . | |
| 0639673 | 8/1947 | United Kingdom . | |
| 1023209 | 10/1964 | United Kingdom . | |
| 1554736 | 10/1975 | United Kingdom . | |
| 2009223 | 12/1978 | United Kingdom | C11D 3/37 |
| 2117500 | 2/1983 | United Kingdom . | |
| 2257709 | 7/1992 | United Kingdom . | |

*Primary Examiner*—Richard D. Lovering
*Attorney, Agent, or Firm*—Timothy J. Troy

[57] ABSTRACT

A particulate foam control agent comprises 1 to 30 parts silicone antifoam, 70 to 99 parts zeolite carrier, 1 to 60% of the antifoam of an organopolysiloxane polyoxyalkylene copolymer, deposited onto the zeolite carrier not later than the antifoam and 1 to 40 parts by weight of a polycarboxylate-type binder or encapsulant. This combination give good release in early stages, storage stability and powder characteristics.

19 Claims, No Drawings

PARTICULATE FOAM CONTROL AGENTS

This invention relates to foam control agents which are particulate, and especially those which are intended for incorporation in detergent compositions which are in powder form. The invention is particularly concerned with silicone based foam control agents in powder form.

Foam control agents based on silicone antifoams, and foam control agents which are in particulate form, are well known in the art. Many patent specifications describe such foam control agents. Silicone base foam control agents for powder detergent compositions are also well known. Particulate foam control agents often use a carrier material in combination with the foam control agents to make these foam control agent into a more substantial and more easily handled solid particulate material, which can be post-blended as a powder with the rest of the powder detergent composition.

Materials which are suggested as carrier materials for particulate silicone based foam control agents include water soluble, water insoluble and water dispersible materials. Examples of suggested carrier materials are sulphates, carbonates, phosphates, polyphosphates, silicas, silicates, clays, starches, cellulosic materials and aluminosilicates. The use of carrier materials adds a component to the final composition of the detergent powder. If the carrier material is not itself a component which contributes to the efficiency or activity of the powder detergent, it will in effect constitute an additional soil which has to be removed during the laundering process. As a result it is desirable to use materials which are standard components in detergent powders.

A particularly preferred carrier material for particulate foam control agents is sodium tripolyphosphate. However, in view of the desire to reduce, and even eliminate, phosphates in detergent compositions for environmental reasons there has been a need to find more suitable carrier materials. Many materials do not have the correct caking ability, density, particle strength or size. This explains why many proposals have used non-active materials in powder detergents, e.g. starch. There is therefore a need to provide other suitable materials as carriers for foam control agents. One particularly useful active material for the detergent composition is zeolite.

Zeolites have been mentioned as an optional carrier material for silicone foam control agents in a number of patent specifications. For example, in G.B. 2 009 223 there is disclosed a process for the preparation of a pulverulent detergent which comprises a pulverulent or granular premix prepared by granulating 50 to 99% of one or more structural substances and/or magnesium silicate with 1 to 15% by weight based on the premix of organic silicon polymers, which are preferably polydimethylsiloxanes which may be combined with a pyrogenic silica (i.e. the antifoam). The structural substances are selected from phosphate, polyphosphate, silicate, aluminosilicate, carbonate, sulphate, polycarboxylate or phosphate in the form of its alkali metal salt. Alumino-silicates which are hydrated and are capable of cation exchange are mentioned, but do not constitute preferred materials. No examples using an alumino-silicate carrier are given. Additional components of the premix may include emulsifiers, waxy compounds and water soluble polymers.

Suggestions that carriers can be selected from a large group of materials, including organic and inorganic materials, which group includes as one option alumino-silicates or zeolites, have also been made in a number of other patent specifications, for example E.P. 013 028, E.P. 142 910, E.P. 206 522 and E.P. 484 081. However, in none of these patent specifications are zeolites used as the actual carrier material for foam control agents.

While investigating the feasibility of the use of zeolites as carrier materials for foam control agents the Applicants observed that there is a problem connected to their use as carrier materials. This problem lies in the fact that, even though the foam control agents can be formed into a good particulate material by using zeolite carriers there is very little, if any, actual control of the foam level in the washing machine, especially in the early part of the washing cycle. This may well be due to the fact that zeolites, being natural absorbent materials, do not release the silicone antifoam sufficiently easily. This explains why nobody has up to now used zeolites as carrier materials for silicone-based foam control agents in commercial powder detergents and why no examples have been included in the above mentioned patent specifications. One possible way to attempt to overcome this problem could involve the use of greatly increased amounts of foam control agent incorporated in a powder detergent composition, resulting in the availability of an excess of foam control agent even at the early stages of the washing cycle. This solution is, however, economically not attractive and often has side effects on the detersive activity of the powder, e.g. resulting in spotting of the laundered fabrics.

In E.P. 329 842 zeolites have been suggested and exemplified as carriers for foam control agents. The specification discloses a powder detergent composition comprising a silica containing silicone foam control agent. The foam control agent consists for 85 to 96% of a zeolite as carrier, 3 to 9% of a low viscosity silicone oil, 1 to 5% of a high viscosity silicone oil and 0.5 to 1.5% of a hydrophobic silica. The examples show a good performance and a good storage stability for a number of these compositions. No details are given of the surfacants used to form the detergent composition. Neither are there any details given on the exact amount of silicone antifoam (i.e. combination of silicone oil and silica) which is used in the foam control agent. If one assumes for the latter the average values of those indicated in the description, this would result in 10% by weight of the foam control agent being taken up by the silicone antifoam. The silicone oil which is used in the silicone antifoam is a mixture of a low viscosity silicone oil and a high viscosity silicone oil. The silicone oil is a linear polydimethylsiloxane and the low viscpsity is given as being in the range from 100 to 5,000 $mm^2/s$ at 25° C., while the high viscosity is given as from 30,000 to 100,000 $mm^2/s$. The examples indicate that 3.75 g of the foam control agent is added to 100 g of powder detergent which includes 13 g of surfactants. This is a higher than average relative level of silicone antifoam (.i.e. 0.375% by weight of the detergent composition), confirming the drawbacks described above.

There is a need to find a method of improving the foam control agents to enable the use of lower concenrations of the antifoam relative to the surfactant concentration in the powder, while achieving a good release of the foam control agent in the early stages of the washing cycle.

There is also a need to find a way of enabling detergent manufacturers to use zeolites as carriers for silicone foam control agents with improving the release of the antifoam into the washing liquor, especially in the early stages of the washing cycle, without having to incorporate very high levels of foam control agents. Many patent specifications describe the problems of diminishing foam control ability of the silicone based foam control agents when stored in powder detergents for prolonged periods of time. Solutions to overcome the storage problem have been suggested and include the use of a variety of materials as encapsulating or protective materials, intended to coat or bind the silicone anti-oam. The theory is that encapsulation, or binding, counteracts the unwanted spreading of the silicone oil of the antifoam onto the surrounding detergent powder which spreading results in the reduction of the concentration of one of the most important ingredients of the foam control agents and, in extreme cases, depleting the foam control agent of the silicone oil altogether, thus deactivating the foam control agent. Encapsulating or protective materials are often used in combination with the carrier material.

Proposed binder or encapsulant material have been described in the art and include an organic material which is water soluble or water dispersible, substantially non-surface active and detergent impermeable, for example gelatin, agar and reaction products or tallow alcohol and ethylene oxide. Alternatively there is suggested the use of a water insoluble wax having a melting point in the range from 55° to 100° C. and a water insoluble emulsifying agent, a non-ionic surfactant, e.g. ethoxylated aliphatic $C_{12-20}$ alcohols with 4 to 20 oxyethylene groups, ethoxylated alkylphenols, fatty acids, amides of fatty acids, thio alcohols and diols, all having 4 to 20 carbon atoms in the hydrophobic part and 5 to 15 oxyethylene groups, a water soluble or water dispersible organic carrier comprising from 1 to 100% of a first organic carrier component having a melting point of from 38° to 90° C. and from 0 to 99% of a second organic carrier which is selected from ethoxylated non-ionic surfactants having a HLB of from 9.5 to 13.5 and a melting point from 5° to 36° C. Examples of the organic carrier materials include tallow alcohol ethoxylates, fatty acid esters and amides and polyvinylpyrrolidone. There is also described the use of a material which is impervious to oily antifoam active substance when in the dry state yet capable of disruption on contact with water, e.g. materials with a waxy nature, which may form an interrupted coating that will allow water to pass through under was conditions or water soluble sugars.

Many of the proposed binders and encapsulants are satisfactory in many situations. However, there is a continuing search for improved foam control agents, especially agents which will give improved powder characteristics.

We have now found that if the silicone antifoam is absorbed on a zeolite carrier in combination with an organopolysiloxane polyoxyalkylene copolymer and a polycarboxylate-type binder or encapsulant, an improved silicone foam control agent is obtained which has better powder characteristics and has a better release of antifoam in the early part of the washing cycle.

The invention provides in a first aspect a particulate foam control agent, comprising from 1 to 30 parts by weight of a silicone antifoam, from 70 to 99 parts by weight of a zeolite carrier for the antifoam, from 1 to 30 by weight of the silicone antifoam of an organopolysiloxane polyoxyalkylene copolymer, which has been deposited onto the zeolite carrier not later than the silicone antifoam and from 1 to 40 parts by weight of a polycarboxylate-type binder.

Silicone antifoams for use in the foam control agents according to the invention are known materials and have been described in a number of patent specifications, including those referred to herein. Silicone antifoams are foam regulating compositions which comprise a liquid organopolysiloxane polymer and a filler particle the surface of which has been rendered hydrophobic.

Liquid organopolysiloxane polymers which are useful in silicone antifoams are also known and have been described in many patent specifications. Full description of all options is therefore not included but can be found in the many publications including patent application E.P. 578 424. Preferably they are linear or branched polymers having a structure according to the general formula

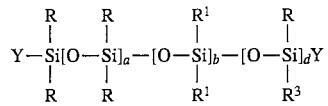

In formula (I) R denotes a monovalent hydrocarbon group having from 1 to 8 carbon atoms, preferably from 1 to 4 carbon atoms, $R^1$ denotes a group R, a hydroxyl group or a group

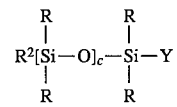

wherein $R^2$ denotes a divalent hydrocarbon, hydrocarbonoxy or siloxane group or oxygen, $R^3$ denotes a $C_{9-35}$ alkyl group, Y denotes a group R or a hydroxyl group, a, b, c and d have a value of 0 or an integer, provided at least one of a and b is an integer, and the total of a+b+c+d has a value such that the viscosity of the organopolysiloxane polymer at 25° C. is at least 50 mm²/s, preferably at least 500 mm²/s. The organopolysiloxane polymers may be linear, in which case $R^1$ denotes R or a hydroxyl group. It is preferred for the linear organopolysiloxanes that Y denotes a group R and that b=0. More preferred are those linear polymers wherein d=0 and wherein at least 80% of all R groups denote an alkyl group having from 1 to 4 carbon atoms, most preferably methyl. It is most preferred that the linear organopolysiloxanes are trimethylsiloxane end-blocked polydimethylsiloxanes. The preferred viscosity of the linear organopolysiloxanes is from 500 to 100,000 mm²/s, more preferably 1000 to 60,000 mm²/s at 25° C.

Organopolysiloxanes which are not linear are also known in the art. The preferred non-linear materials are those having branching in the siloxane chain. These polymers have a structure according to Formula (I), wherein b has a value of at least 1 and $R^2$ is preferably a divalent siloxane group or an oxygen atom. Particularly preferred siloxane groups $R^2$ are small three-dimensional siloxane resin particles which may have a number of pending siloxane polymer units. Branched siloxanes are known and examples of them have been described, together with a method of making them, in a number of patent specifications, e.g. G.B. 639 673, E.P. 31 532, E.P. 217 501, E.P. 273 448, DE 38 05 661 and G.B. 2 257 709.

Preferred liquid organopolysiloxanes are branched or higher viscosity siloxanes.(i.e. above 12,500 mm²/s at 25° C.), especially the branched siloxanes, as they show an improved ability to control foam in most aqueous surfactant solutions.

Filler particles which are useful in the antifoams for use in foam control agents according to the present invention are also well known and have been described in many publications. They are finely divided particulate materials including silica, fumed $TiO_2$, $Al_2O_3$, zinc oxide, magnesium oxide, salts of aliphatic carboxylic acids, reaction products of isocyanates with certain materials, e.g. cyclohexylamine, alkyl amides, for example ethylene or methylene bis stearamide. Most preferred are silica particles with a surface area as measured by BET measurement of at least 50 m²/g. Suitable silica particles may be made according to any of the standard manufacturing techniques for example thermal decomposition of a silicon halide, decomposition and precipitation of a metal salt of silicic acid, e.g. sodium silicate and a gel formation method. Suitable silicas for use in the antifoams include therefore fumed silica, precipitated silica and gel formation silica. The average particle size of these fillers may range from 0.1 to 20 μm, but preferably is from 0.5 to 2.5 μm.

Where the filler particles are not hydrophobic by themselves their surface is rendered hydrophobic in order to make the antifoam sufficiently effective in aqueous systems. Rendering the filler particles hydrophobic may be done prior to, or after, dispersing the filler particles in the liquid organopolysiloxane. This can be effected by treatment of the filler particles with treating agents, e.g. reactive silanes or siloxanes, for example dimethyldichlorosilane, trimethylchlorosilane, hexamethyldisilazane, hydroxyl end-blocked and methyl end-blocked polydimethylsiloxanes, siloxane resins or a mixture of one or more of these. Fillers which have already been treated with such compounds are commercially available from many companies, e.g. Sipernat® D10 from Degussa. The surface of the filler may alternatively be rendered hydrophobic in situ, i.e. after the filler has been dispersed in the liquid organopolysiloxane component. This may be effected by adding to the liquid organopolysiloxane prior to, during or after the dispersion of the filler therein the appropriate amount of treating agent of the kind described above and heating the mixture to a temperature above 40° C. The quantity of treating agent to be employed will depend for example on the nature of the agent and the filler and will be evident or ascertainable by those skilled in the art. Sufficient should be employed to endow the filler with at least a discernible degree of hydrophobicity. The filler particles are added to the organopolysiloxane in an amount of from 1 to 25% by weight of the antifoam, preferably from 2 to 15%, most preferably from 3 to 8%.

The zeolite which may be used in the foam control agents according to the invention may be any of those aluminosilicate materials which are known to be beneficial in detergent powder compositions and have been described in a number of patent specifications. Zeolites are used as cation exchange components. Suitable zeolite materials include particularly those which are known as Zeolite A and have an average formula $(Na_2O)_m \cdot Al_2O_3 \cdot (SiO_2)_n \cdot (H_2O)_t$, wherein m has a value of from 0.9 to 1.3, n a value of from 1.3 to 4.0 and t a value of from 1 to 6. Such zeolites are known ingredients in detergent powder compositions. Suitable zeolites may be crystalline or amorphous aluminosilicates and have been described in particular in E.P. 192 442 and E.P. 329 842 and in the patent specifications which are referred to on page 2 of the latter specification. The zeolites are used in an amount of from 70 to 99 parts by weight of the foam control composition for every 1 to 30 parts of the silicone antifoam. Preferably they comprise about 70 to 99% by weight of the total weight of the components mentioned as forming part of the foam control agent, i.e. the silicone antifoam, the zeolite and the organopolysiloxane polyoxyalkylene copolymer, more preferably 75 to 90%. Suitable zeolites may be pretreated with e.g. non-ionic surfactants, but are preferably untreated zeolites, as they seem to provide a better stability of the foam control agent when stored in a powder detergent composition.

The organopolysiloxane polyoxyalkylene copolymer which may be used in the foam control agents according to the invention is preferably soluble or dispersible in an aqueous surfactant solution. More preferably they are water soluble or water dispersible copolymers. Suitable copolymers have been described in a number of publications and are generally well known in the art. Suitable organopolysiloxane polyoxyalkylene copolymers have a number of units X of the general formula $R^4—Si—O_{4-p/2}$ and at least one unit Y of the general formula $R^5R^6{}_q—Si—O_{3-q/2}$. $R^4$ denotes a monovalent hydrocarbon group having up to 24 carbon atoms, a hydrogen atom or a hydroxyl group, preferably a group $R^6$, which denotes an aliphatic or aromatic hydrocarbon group having up to 24 carbon atoms, preferably up to 18 carbon atoms. Suitable examples of $R^6$ include alkyl, aryl, alkaryl, aralkyl, alkenyl or alkynyl groups, for example methyl, ethyl, dodecyl, octadecyl, phenyl, vinyl, phenylethyl or propargyl. Preferably at least 60% or all $R^6$ groups are methyl or phenyl groups, more preferably 80%. It is most preferred that substantially all $R^6$ groups are methyl or phenyl groups, especially methyl groups. p and g independently have a value of 0, 1, 2 or 3. $R^5$ denotes a group of the general formula $A(OZ)_s—B$ wherein Z is a divalent alkylene unit having from 2 to 8 carbon atoms, A denotes a divalent hydrocarbon radical having from 2 to 6 carbon atoms, optionally interrupted by oxygen, B denotes a capping unit and s is an integer with a value of from 3 to 60. It is preferred that A is a divalent alkylene unit, preferably having 2 to 4 carbon atoms, e.g. dimethylene, propylene or isobutylene. Z is preferably a divalent alkylene unit having 2 or 3 units, e.g. dimethylene or isopropylene. B may be any of the known end-capping units of polyoxyalkylene groups, e.g. hydroxyl, alkoxy, aryloxy, acyl, sulphate, phosphate or mixtures thereof, most preferably hydroxyl, alkoxy or acyl.

Units X and Y may be the majority of units in the copolymer, but preferably they are the only units present in the copolymer. They may be linked to each other in a way to form random copolymers or block copolymers. The units Y may be distributed along the siloxane chain of the copolymer or they may be placed at one or both ends of such siloxane chain. Suitable copolymers will therefore have one of the following structures wherein X' denotes one or more units X and Y' denotes one or more units Y: X'Y', Y'X'Y'/ X'Y'X', Y'(X'Y')$_e$, Y'(X'Y')$_e$X', X'(Y'X')$_e$ or any one of the above structure wherein one or more Y' groups have divalent polyoxyalkylene units which are linked at either end to a siloxane unit, thus forming a type of cross-linked polyorganosiloxane polyoxyalkylene unit. The value of e is no important provided the copolymer satisfies the conditions of solubility or dispersibility laid down. Suitable copolymers have been described for example in Patent Specifications G.B. 1 023 209, G.B. 1 554 736, G.B. 2 113 236, G.B. 2 119 394, G.B. 2 166 750, G.B. 2 173 510, G.B. 21 175 000, E.P. 125 779, E.P. 212 787, E.P. 298 402 and E.P. 381 318.

It is preferred that the organopolysiloxane polyoxyalkylene copolymer has a substantially linear siloxane backbone, i.e. that the value of p is 2 and g is 1 for the majority of units present in the copolymer. This will result in a so-called ABA type polymer or in a rake type polymer. In the former units Y will be situated at each end of the siloxane chain, while in the latter units X and Y are dispersed along the siloxane chain, with the oxyalkylene units pending from the chain at certain intervals. More preferred are those copolymers which have the general formula

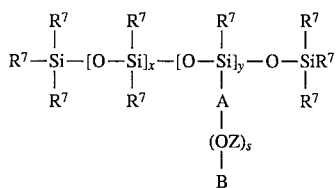

R⁷ in these more preferred copolymers may denote any alkyl or aryl group having up to 18 carbon atoms, more preferably 6. Particularly preferred are methyl, ethyl or phenyl groups. Especially preferred are those copolymers wherein at least 80% of all R⁷ groups in the copolymer, most preferably substantially all R⁷ groups, are methyl groups. A in these more preferred copolymers denotes a $C_{2-3}$ alkylene unit, most preferably propylene or isopropylene. Z preferably denotes a dimethylene group for at least half of all Z groups present in the copolymer, the other half being isopropylene groups. More preferably at least 70% of all Z groups are dimethylene groups, most preferably all Z groups, making the polyoxyalkylene portion a polyoxyethylene portion. B preferably denotes a hydroxyl group or an acyl group. The value of x may be 0 or an integer, preferably from 1 to 500, and the value of y may be any integer, preferably a value of from 1 to 500. x, y and s are chosen thus that the copolymer is either fully soluble or is dispersible in water or preferably in an aqueous surfactant solution. It is therefore preferred to balance the hydrophobic nature of the copolymer, which is determined to a large extent by the value of x, with the hydrophilic nature, which is determined to a large extent by the value of y and s and by group Z. E.g. if the value of x is large, a long siloxane chain is formed which will make the copolymer less soluble and more dispersible in the aqueous surfactant solution of the washing liquor. This may be balanced by increasing the amount of units having oxyalkylene groups (value of y) and by the size of the polyoxyalkylene groups (value of s, especially where Z is dimethylene).

Particularly preferred organopolysiloxane polyoxyalkylene copolymers will be those where the value of x+y is in the range of from 1 to 500. A first more preferred copolymer has a value for x+y in the range from 1 to 50. The preferred ratio for these materials of y/x+y is from 0.02 to 1, more preferably 0.08 to 1. The value of s is preferably in the range from 4 to 60, more preferably 5 to 40, most preferably 7 to 36. A particularly useful copolymer is the one wherein x+y has a value of about 1 to 20, y/x+y has a value of about 0.3 to 1 and s has a value of 12, wherein the majority of Z units are dimethylene units. A second more preferred copolymer has a value for x+y in the range from 50 to 500, even more preferably 80 to 350. The preferred ratio for these materials of y/x+y is from 0.02 to 0.1, more preferably 0.05 to 0.08. The value of S is preferably as for the first more preferred copolymer. A particularly useful copolymer is the one wherein x+y has a value of about 100 to 120, y/x+y has a value of about 0.09 and s has a value of 36, wherein half of the Z units are dimethylene units and half are isopropylene units.

Organopolysiloxane polyoxyalkylene copolymers which are useful in foam control agents of the invention are known in the art, have been described in a number of patent specifications as described above, and many of them are commercially available. They may be made by a variety of methods which have also been described or referenced in the above mentioned specifications, which are hereby included by reference. One particularly useful way of making suitable copolymers is by reaction of polyorganosiloxanes having silicon-bonded hydrogen atoms with appropriate allylglycols (allyl-polyoxyalkylene polymers) in the presence of a noble metal catalyst. A hydrosilylation reaction will ensure the addition reaction of the allyl group to the silicon atom to which the hydrogen atom was bonded.

The binder or encapsulant is a polycarboxylate material. So-called polycarboxylate materials have been described in the art, and have the advantage that, as zeolites, they are useful ingredients in detergent compositions. Some of them have been suggested as polymeric coatings for antifoam ingredients in E.P. 484 081, in conjunction with a silicone oil antifoam and a solid carrier which, though suggested as possibly being a zeolite, is preferably a carbonate. No examples of the combination with zeolites is given, reinforcing the arguments given above, relating to the release problems experienced with the use of zeolites as carriers without the use of this invention.

Polycarboxylate materials are known as dispersing agents in detergent powders and are water soluble polymers, copolymers or salts thereof. They have at least 60% by weight of segments with the general formula

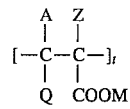

wherein A, Q and Z are each selected from the group consisting of hydrogen, methyl, carboxy, carboxymethyl, hydroxy and hydroxymethyl, M is hydrogen, alkali metal, ammonium or substituted ammonium and t is from 30 to 400. Preferably A is hydrogen or hydroxy, Q is hydrogen or carboxy and Z is hydrogen. Suitable polymeric polycarboxylates include polymerised products of unsaturated monomeric acids, e.g. acrylic acid, maleic acid, maleic anhydride, fumaric acid, itaconic acid, aconitic acid, mesaconic acid, citraconinc acid and methylenemalonic acid. The copolymerisation with lesser amounts of monomeric materials comprising no carboxylic acid, e.g. vinylmethyl, vinylmethylethers, styrene and ethylene is not detrimental to the use of the polycarboxylates in the foam control agents of the present invention. Depending on the type of polycarboxylate this level can be kept low, or levels can be up to about 40% by weight of the total polymer or copolymer.

Particularly suitable polymeric polycarboxylates are polyacrylates with an average viscosity at 23° C. in mPa.s from 50 to 10,000, preferably 2,000 to 8,000. The most preferred polycarboxylate polymers are acrylate/maleate or acrylate/fumarate copolymers or their sodium salts. Molar mass of suitable polycarboxylates may be in the range from 1,000 to 500,000, preferably 3,000 to 100,000, most preferably 15,000 to 80,000. The ratio of acrylate to maleate or fumarate segments of from 30:1 to 2:1. Carboxylates may be supplied in powder form or liquid forms. They may be liquid at room temperature or may be supplied as aqueous solutions. The latter are preferred as they facilitate the manufacture of the foam control agents according to the invention with conventional spray applications. Many of the polycarboxylates are hygroscopic but are claimed not to absorb water from the air when formulated in detergent powders.

It was surprisingly found that the use of polycarboxylates as binders and/or encapsulants for antifoam in the foam control agents of the present invention enabled a more efficient absorption of antifoam onto the carrier, resulting in a more efficient foam control agent. It was also found that the combination of all the ingredients allowed the manufacture of a particulate foam control agent with improved powder characteristics. For example, foam control agents according to the invention provide better mechanical strength and flowability of the foam control agent and are also more environmentally friendly because of avoiding the need to include other materials into powder detergents which have no direct benefit to the efficiency of the detergent composition. Foam control agents according to the present invention are particularly useful for compact washing powders.

In the method of the invention it is important that the silicone antifoam is not deposited onto the zeolite surface prior to the deposition of the organopolysiloxane polyoxyalkylene copolymer. If this condition is not fulfilled, the antifoam release in the initial part of a washing cycle will not be as good. The preferred method is where a mixture of the copolymer and the silicone antifoam is deposited onto the zeolite surface, or even more preferred, where a mixture of the three components (silicone antifoam, organopolysiloxane polyoxyalkylene copolymer and binder or encapsulant) is made according to any of the known methods, and this mixture deposited onto the zeolite surface. The premix can be made by simply mixing the ingredients, preferably with reasonable shear or high shear. Where one or more ingredients are solid or waxy materials, or materials of high viscosity, it may be beneficial to heat the mixture to melt or reduce the working viscosity of the mix. Alternatively the premix of the components may be diluted with a solvent, e.g. a low viscosity siloxane polymer, cyclic siloxane polymer, organic solvent or even by making a dispersion in water.

Depositing the mix onto zeolites can be done in a number of ways. Conventional procedures of making powders are particularly useful for making the particulate foam control agent. These include depositing of a previously prepared mixture of all of the two or three components onto the zeolite which is the most preferred method. It is also possible to deposit each of the ingredients separately onto the zeolite, in which case it is important that the silicone antifoam is not deposited prior to the organopolysiloxane polyoxyalkylene copolymer. This is also important if a mixture of only two ingredients out of three is deposited separately from the third ingredient. For example the organopolysiloxane polyoxyalkylene copolymer may be deposited first, followed by deposition of a mixture of the silicone antifoam and the binder or encapsulant. Alternatively, the silicone antifoam may be mixed with the organopolysiloxane polyoxyalkylene copolymer and deposited onto the foam control agent prior to depositing the binder or encapsulant. It is less beneficial to make a mixture of the organopolysiloxane polyoxyalkylene copolymer with the binder or encapsulant and to deposit this prior to the deposition of the silicone antifoam. One particularly useful way of depositing the components onto the zeolite is by spraying one or more of these onto the zeolite, which may be present in a drum mixer, fluidised bed etc. This may be done at room temperature or at elevated temperature, which is particularly useful if one wants to evaporate some or all of the solvent during the process. In one process the zeolite powder is mixed with the premix of all the other components, e.g. in a high shear mixer, e.g. Elrich® pan granulator, Schugi® mixer, Paxeson-Kelly® twin-core blender, Loedige® ploughshare mixer, Aeromatic® fluidised bed granulator or Pharma® type drum mixer. The deposition may be done by pouring the mixture into the mixer, as well as spraying, as is described above.

The process of the invention uses from 1 to 30 parts by weight of silicone antifoam and from 70 to 99 parts by weight of zeolite. If a lower amount of silicone antifoam were to be used this would make the foam control agent less effective as the silicone antifoam would be too thinly distributed on the carrier material. Higher amounts than 30 parts of silicone antifoam are possible in theory, but are not practical, as this would render the dispersion of the foam control agent in the powder detergent more difficult and one could not be sure that each measure of powder detergent would incorporate the correct amount of silicone antifoam. Higher levels would also possibly result in a more tacky material which would not be granulated very easily.

Thus use of 1 to 60% of organopolysiloxane polyoxyalkylene copolymer by weight based on the weight of the silicone antifoam is chosen for efficiency reasons as well as to minimise the amount of material which is to be introduced in the powder detergent which is not per se beneficial to the cleaning efficiency of the detergent composition. For the first more preferred copolymer, as defined above, it is more preferred to use 5 to 60% by weight, especially 5 to 35% by weight, based on the weight of the silicone antifoam. For the second more preferred copolymer as defined above, it is more preferred to use 1 to 35% by weight based on the weight of the silicone antifoam. Most preferably the amount of copolymer used is from 1 to 20% of the silicone antifoam, for the first more preferred copolymer, especially 10 to 20% by weight.

The amount of polycarboxylate is to be used in an amount of from 1 to 40 parts by weight, preferably the amount of binder or encapsulating material is used in amounts of from 10 to 30 parts, most preferably 15 to 25 parts by weight.

There is also provided in another aspect of the present invention a detergent composition in powder form which comprises 100 parts by weight of a detergent component and sufficient of a foam control agent according to the first aspect of the invention to give 0.05 to 5 parts by weight of the silicone antifoam comprised in the foam control agent.

Suitable detergent components are well known in the art and have been described in numerous publications. The components comprise an active detergent, organic and/or inorganic builder salts and other additives and diluents. The active detergent may comprise organic detergent surfactants of the anionic, cationic, non-ionic or amphoteric type, or mixtures thereof. Suitable anionic organic detergent surfactants include alkali metal soaps of higher fatty acids, alkyl aryl sulphonates for example sodium dodecyl benzene sulphonate, long chain (fatty) alcohol sulphates, olefin sulphates and sulphonates, sulphated monoglycerides, sulphated esters, sulphosuccinates, alkane sulphonates, phosphate esters, alkyl isothionates, sucrose esters and fluorosurfactants. Suitable cationic organic detergent surfactants include alkylamine salts, quaternary ammonium salts, sulphonium salts and phosphonium salts. Suitable non-ionic detergent surfactants include condensates of ethylene oxide with a long chain (fatty) alcohol or (fatty) acid, for example $C_{1-4}^{15}$ alcohol, condensed with 7 moles of ethylene oxide (Dobanol® 457), condensates of ethylene oxide with an amine or an amide, condensation products of ethylene and propylene oxides, fatty acid alkylol amide and fatty amine oxides. Suitable amphoteric organic detergent surfactants include imidazoline compounds, alkylaminoacid salts and betaines. Examples of inorganic components are phosphates, polyphosphates, silicates, carbonates, sulphates, oxygen releasing compounds such as sodium perborate and other bleaching agents and aluminosilicates, e.g. zeolites. Examples of organic components are anti-redeposition agents such as carboxymethylcellulose (CMC), brighteners, chelating agents, such as ethylene diamine tetra-acetic acid (EDTA) and nitrilotriacetic acid (NTA), enzymes and bacteriostats. Other optional components include colorants, dyes, perfumes, softeners, clays, some of which may be encapsulated. Materials suitable for the detergent component are well known to the person skilled in the art and are described in many text books as well as other publications.

There now follows an example to illustrate the invention, in which all parts and percentages are given by weight unless otherwise indicated.

EXAMPLE A

A foam control agent was prepared by mixing 80 parts of Wessalith® P, a zeolite a manufactured by Degussa with a mixture of 30 parts of Sokolan® CP45, a polycarboxylate copolymer provided by BASF, 18 parts of a silicone antifoam (A) and 2 parts of an organopolysiloxane polyoxyalkylene copolymer (B). The mixture was prepared by pure mechanically mixing the antifoam and copolymer together and pouring the mixture very slowly into a drum mixer in which the zeolite was placed. The mixture was stirred continuously until a particulate material was obtained. The silicone antifoam comprised a branched polydimethylsiloxane polymer and 5% hydrophobic silica, and was prepared according to the teaching of E.P. 217 501. The copolymer had a molecular weight of about 26,000 with about 10% of the siloxane units having a pending polyoxyalkylene group. The polyoxyalkylene part is a polyoxyethylene/polyoxypropylene group having about 20 units of each oxyethylene and oxypropylene groups.

Preparation of the Powder Detergent Composition

A powder detergent composition was prepared by mixing together 30 parts of sodium tripolyphosphate, 15 parts of sodium carbonate, 6.5 parts of sodium sulphate, 12.5 parts of dodecyl benzene sulphonate, 10 parts of a non-ionic surfactant made by the condensation of a $C_{12-15}$ alcohol with 7 moles of ethylene oxide, 16 parts of sodium perborate monohydrate, 4.5 parts of Sokolan® CP45 (a polycarboxylate), 4 parts of zeolite A and 1.4 parts of water. 4 Lots (Lots 1, 2, 3 and 4) were prepared by adding to 100 g of the detergent composition sufficient of the foam control agent described above to give 0.20 g of the silicone antifoam in each lot.

Testing of the release in the washing cycle

A Conventional automatic front-loading washing machine, having a transparent loading door, was loaded with 3.5 kg of clean cotton fabric. A wash cycle with a prewash and main wash (90° C.) was carried out with each of the Lots prepared above. The door of the washing machine was divided in its height by a scale from 0 to 4, with regular intervals. The foam height during the wash cycle was recorded when the rotation drum of the washing machine was stationary. Higher values indicate a higher foam level in the machine and thus worse performance of the foam control agent. Levels of 1 mean that no foam was present, while levels of 6 indicate that the foam caused overflowing of the washing liquor through the top of the machine (a special collection device was mounted at the powder inlet compartment).

Lot 1 of the prepared detergent was tested for efficiency immediately. Lots 2, 3 and 4 were stored at 40° C. for 2, 4 and 6 weeks respectively before testing. In all cases release during the washing cycle and foam control were good, showing very little loss of performance on both accounts with storage.

EXAMPLE B

A foam control agent was prepared according to Example A, except that 26 parts of Sokolan® CP5 were used, 15 parts of a silicone antifoam (A') and 0.8 parts of an organopolysiloxane polyoxyalkylene copolymer (B'). The silicone antifoam (A') comprised a branched polydimethylsiloxane polymer and 3% hydrophobic silica and was prepared according to the teaching of E.P. 217 501. The copolymer (B') had a MW of about 824 (having a degree of polymerisation of 3), with on average 1 siloxane unit having a pending polyoxyalkylene group per molecule. The polyoxyalkylene part is a poloxyethylene group having about 12 units.

Preparation of the Powder Detergent Composition

A powder detergent composition was received from a customer, and comprises 5% non-ionic surfactant and 5 to 10% anionic surfactants. To 3 lots of 100 g of the detergent composition (Lots 5, 6 and 7) were added sufficient of the foam control agent of the example to give 0.20 g of the silicone antifoam in each Lot.

One lot was tested immediately (Lot 5), 2 lots were stored at 40° C. prior to testing. One lot was tested after 2 weeks of storage (Lot 6), one after 4 weeks (Lot 7). Testing was done as described for Example A.

Table I shows the foam levels for each of the powder detergent composition lots for the first 30 minutes of the washing cycle. Lower levels in this part indicate better release of the antifoam in the washing liquor. A comparative lot (Lot C1) was tested, in which a detergent powder was used in which the foam control agent did not contain a organopolysiloxane polyoxyalkylene copolymer.

TABLE I

| | Foam Height v Time in Minutes | | | | | | |
|---|---|---|---|---|---|---|---|
| | 0 | 5 | 10 | 15 | 20 | 25 | 30 |
| Lot 5 | 0 | 1 | 2 | 2 | 2 | 2 | 2 |
| Lot 6 | 0 | 1 | 1 | 2 | 2 | 2 | 2 |
| Lot 7 | 0 | 0 | 1 | 2 | 2 | 2 | 2 |
| Lot C1 | 0 | 3 | 6 | 5 | 2 | 1 | 1 |

It is clear that foam control agents according to the invention provide a better release in the early stages of the washing cycle, thus avoiding overflow of the washing liquor.

EXAMPLE C

A number of foam control agents (8, C2, C3, C4 and C5) were prepared according to the method described for Example A, They are specified in Table II, with all ingredients given in weight percent, where StOH denotes stearyl alcohol, WP denotes Wessalith® P zeolite, MZS denotes maize starch, A denotes a silicone antifoam, SCP denotes Sokolan® CP5, a polycarboxylate polymer provided by BASF, COP denotes an organopolysiloxane polyoxyalkylene copolymer as used in Example A.

TABLE II

| Agent | MZS | WP | StOH | SCP | COP | Water |
|---|---|---|---|---|---|---|
| 8 | — | 70.8 | — | 11.2 | 1.0 | 3.0 |
| C2 | 62.5 | — | 22.5 | — | — | — |
| C3 | — | — | — | 7.1 | — | 3.0 |

TABLE II-continued

| Agent | MZS | WP | StOH | SCP | COP | Water |
|-------|-----|------|------|------|-----|-------|
| C4 | — | 57.9 | 21.8 | — | 2.9 | 2.9 |
| C5 | — | 71.1 | — | 11.5 | — | 3.0 |

The foam control agents of Table II were then tested for bulk density (in g/l), flow (time required in seconds for 537 ml to flow through a standardised funnel) and compaction (in % volume decrease of powder sample subjected to a constant standardised force in a vertical 5 cylinder). Results are given in Table III.

TABLE III

| Agent | Bulk Density (g/l) | Flow (s) | Compaction (%) |
|-------|--------------------|----------|----------------|
| 8 | 839 | 3.2 | 1.5 |
| C2 | 565 | 7.8 | 20.4 |
| C3 | 655 | 4.0 | 3.0 |
| C4 | 781 | 2.8 | 3.0 |
| C5 | 830 | 3.4 | 1.5 |

It can be seen that the combination of zeolite and polycarboxylate gives better powder characteristics than the prior art. Lots 8 and C5 were also tested for foam control efficiency according to the test shown in Example A, using the same detergent composition. Results are given in Table IV.

TABLE IV

| | Foam Height v Time in Minutes | | | | | | |
|---|---|---|---|---|---|---|---|
| | 0 | 5 | 10 | 15 | 20 | 25 | 30 |
| Lot 8 | 0 | 1 | 1 | 1 | 1 | 2 | 3 |
| Lot C5 | 0 | 3 | 6 | 5 | 2 | 1 | 1 |

This shows that foam controls according to the present invention release the antifoam easier in the early part of the wash cycle.

That which is claimed is:

1. A particulate foam control agent comprising from 1 to 30 parts by weight of a silicone antifoam, from 70 to 99 parts by weight of a zeolite carrier for the antifoam, from 1 to 60% by weight of the silicone antifoam of an organopolysiloxane polyoxyalkylene copolymer, which has been deposited onto the zeolite carrier not later than the silicone antifoam and from 1 to 40 parts by weight of a polycarboxylate-type binder or encapsulant.

2. A foam control agent according to claim 1 wherein the silicone antifoam comprises a liquid organopolysiloxane polymer and a filler particle the surface of which has been rendered hydrophobic, the organopolysiloxane being selected from the group consisting of linear and branched polymers having a structure according to the general formula

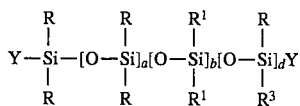

wherein R denotes a monovalent hydrocarbon group having from 1 to 8 carbon atoms, $R^1$ is selected from the group consisting of monovalent hydrocarbon groups having from 1 to 8 carbon atoms, a hydroxyl group and a group

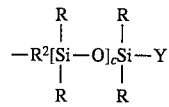

wherein $R^2$ is selected from the group consisting of divalent hydrocarbon groups, divalent hydrocarbonoxy groups, divalent siloxane groups and oxygen, $R^3$ denotes a $C_{9-35}$ alkyl group, Y is selected from the group consisting of monovalent hydrocarbon groups having from 1 to 8 carbon atoms and a hydroxyl group, a, b, c and d independently have a value of 0 or an integer, provided at least one of a and h is an integer, and the total of a+b+c+d has a value such that the viscosity of the organopolysiloxane polymer is at least 50 $mm^2/s$ at 25° C.

3. A foam control agent according to claim 2 wherein the organopolysiloxane polymer is linear, R' is selected from the group consisting of monovalent hydrocarbon groups having from 1 to 8 carbon atoms and a hydroxyl group, Y denotes a group R and b and d=0.

4. A foam control agent according to claim 3 wherein the linear organopolysiloxane is a trimethylsiloxane endblocked polydimethylsiloxane with a viscosity of from 500 to 100,000 $mm^2/s$ at 25° C.

5. A foam control agent according to claim 2 wherein the organopolysiloxane has branching in the siloxane chain and wherein b has a value of at least 1 and $R^2$ is selected from the group consisting of divalent siloxane groups and an oxygen atom.

6. A foam control agent according to claim 2 wherein the filler particles are silica particles with a surface area as measured by BET measurement of at least 50 $m^2/g$ and with an average particle size of from 0.1 to 20 μm.

7. A foam control agent according to claim 1 wherein the zeolite is a Type A zeolite having an average formula $(Na_2O)_m.Al_2O_3.(SiO_2)_n.(H_2O)_t$, wherein m has a value of from 0.9 to 1.3, n a value of from 1.3 to 4.0 and t a value of from 1 to 6.

8. A foam control agent according to claim 1 wherein the organopolysiloxane polyoxyalkylene copolymer is selected from the group consisting of those Which are soluble and those which are dispersible in an aqueous surfactant solution.

9. A foam control agent according to claim 1 wherein the organopolysiloxane polyoxyalkylene copolymer is selected from the group consisting of those which are water soluble and those which are water dispersible copolymers.

10. A foam control agent according to claim 1 wherein the organopolysiloxane polyoxyalkylene copolymer has a number of units X of the general formula $R^4_p$—Si—$O_{4-p/2}$ and at least one unit Y of the general formula $R^5R^6_q$—Si—$O_{3-q/2}$, wherein $R^4$ is selected from the group consisting of monovalent hydrocarbon groups having up to 24 carbon atoms, a hydrogen atom and a hydroxyl group, $R^6$ is selected from the group consisting of aliphatic hydrocarbon groups having up to 24 carbon atoms and aromatic hydrocarbon groups having up to 24 carbon atoms, $R^5$ denotes a groups of the general formula A—$(OZ)_s$—B, wherein Z is a divalent alkylene unit having from 2 to 8 carbon atoms, A is selected from the group consisting of divalent hydrocarbon radicals having from 2 to 6 carbon atoms and divalent hydrocarbon groups having from 2 to 6 carbon atoms interrupted by oxygen, B denotes a capping unit p and g have independently a value of 0, 1, 2 or 3 and s is an integer with a value of from 3 to 30.

11. A foam control agent according to claim 1, wherein the organopolysiloxane polyoxyalkylene copolymer has the general formula

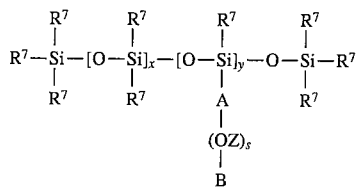

wherein $R^7$ is selected from the group consisting of alkyl and aryl groups having up to 18 carbon atoms, x denotes 0 or an integer, y denotes an integer, A is selected from the group consisting of divalent hydrocarbon radicals having from 2 to 6 carbon atoms and divalent hydrocarbon groups having from 2 to 6 carbon atoms interrupted by oxygen, Z is a divalent alkylene unit having from 2 to 8 carbon atoms, B denotes a capping unit, and s is an integer with a value of from 3 to 60.

12. A foam control agent according to claim 11 wherein the value of x+y is in the range of from 1 to 50, the ratio of y/x+y is from 0.02 to 1, the value of s is in the range from 4 to 60.

13. A foam control agent according to claim 1 wherein the organopolysiloxane polyoxyalkylene copolymer is used in an amount of from 1 to 20% by weight of the silicone antifoam.

14. A foam control agent according to claim 1 wherein the polycarboxylate-type binder or encapsulant is selected from the group consisting of water soluble polymers, water soluble copolymers and salts thereof, having at least 60% by weight of segments with the general formula

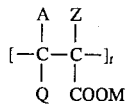

wherein A, Q and Z are each selected from the group consisting of hydrogen, methyl, carboxy, carboxymethyl, hydroxy and hydroxymethyl, M is selected from the group consisting of hydrogen, alkali metal, ammonium and substituted ammonium and t is from 30 to 400.

15. A foam control agent according to claim 14 wherein in the polycarboxylate type binder or encapsulant, A is selected from the group consisting of hydrogen and hydroxyl, Q is selected from the group consisting of hydrogen and carboxy and Z is hydrogen.

16. A foam control agent according to claim 1 wherein the polycarboxylate-type binder or encapsulant includes polymerised products of unsaturated monomeric acids, selected from the group consisting of acrylic acid, maleic acid, maleic anhydride, fumaric acid, itaconic acid, aconitic acid, mesaconic acid, citraconic acid and methylenemalonic acid.

17. A foam control agent according to claim 16 wherein the polycarboxylate-type binder or encapsulant includes polymerised products of up to 40% of monomeric materials comprising no carboxylic acid, selected from the group consisting of vinylmethyl, vinylmethylether, styrene and ethylene.

18. A foam control agent according to claim 16 wherein the polycarboxylate-type binder or encapsulant is selected from the group consisting of polyacrylates, acrylate/maleate copolymers, acrylate/fumarate copolymers, sodium salts of polyacrylates, sodium salts of acrylate/maleate copolymers and sodium salts of acrylate/fumarate copolymers.

19. A detergent composition in powder form which comprises 100 parts by weight of a detergent component and sufficient of a foam control agent according to claim 1 to give 0.05 to 5 parts by weight of the silicone antifoam comprised in the foam control agent.

* * * * *